US012675245B2

(12) United States Patent
Kurokawa

(10) Patent No.: US 12,675,245 B2
(45) Date of Patent: Jul. 7, 2026

(54) INFORMATION PROCESSING APPARATUS, NON-TRANSITORY COMPUTER READABLE MEDIUM STORING PROGRAM, AND INFORMATION PROCESSING METHOD THAT REDUCE INFORMATION LEAKAGE

(71) Applicant: FUJIFILM Business Innovation Corp., Tokyo (JP)

(72) Inventor: Masaki Kurokawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/189,223

(22) Filed: Mar. 24, 2023

(65) Prior Publication Data

US 2024/0086121 A1 Mar. 14, 2024

(30) Foreign Application Priority Data

Sep. 9, 2022 (JP) ................................. 2022-144095

(51) Int. Cl.
*G06F 3/12* (2006.01)
*G06F 21/45* (2013.01)

(52) U.S. Cl.
CPC .......... *G06F 3/1205* (2013.01); *G06F 3/1231* (2013.01); *G06F 21/45* (2013.01); *G06F 2221/2117* (2013.01)

(58) Field of Classification Search
CPC ...... G06F 3/1205; G06F 3/1231; G06F 21/45; G06F 2221/2117
See application file for complete search history.

(56) References Cited

U.S. PATENT DOCUMENTS 7,827,149 B2 11/2010 Kodama et al.
9,436,423 B2 9/2016 Doui
(Continued)

FOREIGN PATENT DOCUMENTS

JP 2009157819 7/2009
JP 4564044 10/2010
(Continued)

*Primary Examiner* — Nicholas Pachol
(74) *Attorney, Agent, or Firm* — JCIPRNET

(57) ABSTRACT

An information processing apparatus includes a processor configured to accept an instruction to generate a second account indicating access information for permitting access to a second storage area, which is different from a first account that indicates a registered user and indicates access information for permitting access to a first storage area, generate the second account in association with the registered first account, perform control such that setting information set for a first device is acquired and stored in the second storage area by using the second account in a case where a request indicating that the setting information is to be stored in the second storage area is accepted, perform control such that the setting information stored in the second storage area is acquired by using the second account from a second device different from the first device and is output to the second device, and perform control such that the setting information stored in the second storage area is moved to the first storage area and the second account and the second storage area are erased.

11 Claims, 5 Drawing Sheets

(56)     References Cited

U.S. PATENT DOCUMENTS

| | | | |
|---|---|---|---|
| 2007/0124400 A1* | 5/2007 | Lee ........................ | G06F 21/604 709/206 |
| 2009/0328154 A1* | 12/2009 | Field ...................... | G06F 21/46 726/4 |
| 2010/0146070 A1* | 6/2010 | McDowall ........... | G06Q 10/107 709/216 |
| 2010/0146607 A1* | 6/2010 | Piepenbrink ........ | G06F 21/6218 709/223 |
| 2013/0204925 A1* | 8/2013 | McDougall ............. | H04L 67/10 709/203 |
| 2015/0212770 A1* | 7/2015 | Song ..................... | G06F 3/1222 358/1.15 |
| 2017/0094079 A1* | 3/2017 | Watanabe ............. | G06F 3/1238 |
| 2019/0050170 A1* | 2/2019 | Ren ....................... | G06F 3/1288 |
| 2021/0314461 A1* | 10/2021 | Hatada ................ | H04N 1/32117 |
| 2022/0066707 A1* | 3/2022 | Shiohara ............... | G06F 3/1238 |
| 2022/0075578 A1* | 3/2022 | Kawakami ........... | G06F 3/1238 |
| 2023/0119508 A1* | 4/2023 | Tomioka .............. | G06F 3/1205 358/1.14 |
| 2023/0185931 A1* | 6/2023 | Acharya ................ | H04L 63/10 |

FOREIGN PATENT DOCUMENTS

| | | |
|---|---|---|
| JP | 2013235339 | 11/2013 |
| JP | 2015001787 | 1/2015 |
| JP | 5821903 | 11/2015 |
| JP | 2017215856 | 12/2017 |

* cited by examiner

INFORMATION PROCESSING APPARATUS, NON-TRANSITORY COMPUTER READABLE MEDIUM STORING PROGRAM, AND INFORMATION PROCESSING METHOD THAT REDUCE INFORMATION LEAKAGE

CROSS-REFERENCE TO RELATED APPLICATIONS

This application is based on and claims priority under 35 USC 119 from Japanese Patent Application No. 2022-144095 filed Sep. 9, 2022.

BACKGROUND

(i) Technical Field

The present disclosure relates to an information processing apparatus, a non-transitory computer readable medium storing a program, and an information processing method.

(ii) Related Art

JP2009-157819A discloses an electronic device service and system in which an electronic device having a communication function and a function of recording information, an information service unit that backs up information regarding the electronic device, and an information recording unit that records information in the electronic device are connected via a network and information is exchanged between the electronic device, the information service unit, and the information recording unit. In this technology, the information service unit authenticates the electronic device in association with first authentication information based on the information regarding the electronic device, the electronic device transmits a backup request including the first authentication information as a backup request for the information recorded in the electronic device to the information service unit, the information service unit discriminates the backup request from the electronic device and backs up the information recorded in the electronic device, the information service unit authenticates the electronic device as an electronic device under management of the information recording unit in association with second authentication information based on the information from the information recording unit, the electronic device under the management of the information recording unit transmits a restore request including the second authentication information as a restore request for information backed to the information service unit in association with the first authentication information to the information service unit, and the information service unit discriminates the restore request and restores the information backed up in association with the first authentication information to the electronic device under the management of the information recording unit.

JP2015-001787A discloses a cloud server for a cloud service. In this technology, the cloud server includes a target device setting unit that sets a designated information device as a target of use restriction, restriction setting unit that sets at least one use permission account which is an account that can log in and can use the information device and a use restriction in the information device for the use permission account, and a use restriction unit that permits the use of the information device in a range in which the restriction set for the use permission account is satisfied for a user who logs in with the use permission account. The restriction setting unit sets, as the use permission account, a user account that specifies one or both of a user already registered in the cloud server and a guest account determined by a designated person of the information device in response to a setting input.

JP2017-215856A discloses a system for sharing data among a plurality of user terminals. In this technology, a data sharing server that includes a user account information storage unit that stores user account information including a mail address and a password of a user and user group information including two or more users, a storage area in which a partial storage area for independent data sharing is set for each user group, an access management unit that manages access of the user to the storage area based on the user account information and the user group information, and a storage area operation management unit that enables an operation for the partial storage area from the user terminal. The storage area operation management unit accepts operations of inputting, outputting, and deleting data and operations of creating and deleting a data folder in the partial storage area by an operation on a web browser on the user terminal.

JP2013-235339A discloses a cloud storage server that cooperates with an information communication terminal and a file. In this technology, the cloud storage server includes a setting unit that sets a storage unit that temporarily stores a file generated by operating an application function of the information communication terminal, and an erasing unit that erases the file stored in the storage unit after the operation of the application function is ended.

SUMMARY

Incidentally, in the device used by the user, setting information indicating a setting value of processing used by the user may be set, and the setting information may be wanted to be used in another device. However, in order to enable the use of the setting information in another device, in a case where the setting information set for the device is stored in the storage area to be acquirable by any third party, information may be leaked.

Aspects of non-limiting embodiments of the present disclosure relate to an information processing apparatus, a non-transitory computer readable medium storing a program, and an information processing method that can reduce information leakage as compared with a case where setting information set for a device is stored in a storage area to be acquirable by any third party.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to accept an instruction to generate a second account indicating access information for permitting access to a second storage area, which is different from a first account that indicates a registered user and indicates access information for permitting access to a first storage area, generate the second account in association with the registered first account, perform control such that setting information set for a first device is acquired and stored in the second storage area by using the second account in a case where a request indicating that the setting information is to be stored in the second storage area is accepted, perform control such that the setting information stored in the second storage area is acquired by using the second account from a second device different from the first device and is output to the second device, and perform control such that the setting information stored in the second storage area is moved to the first storage area and the second account and the second storage area are erased.

BRIEF DESCRIPTION OF THE DRAWINGS

Exemplary embodiment(s) of the present invention will be described in detail based on the following figures, wherein.

DETAILED DESCRIPTION

Hereinafter, an example of an exemplary embodiment for implementing a technology of the present disclosure will be described in detail with reference to the drawings. Components and processing having identical operations, actions, and functions are given identical reference signs throughout the drawings, and redundant descriptions may be omitted as appropriate. Each drawing is only schematically illustrated to the extent that the technology of the present disclosure can be fully understood. Thus, the technology of the present disclosure is not limited only to the illustrated examples. In the present exemplary embodiment, descriptions of configurations that are not directly related to the present invention and well-known configurations may be omitted.

First Exemplary Embodiment

Figures 1, 2:
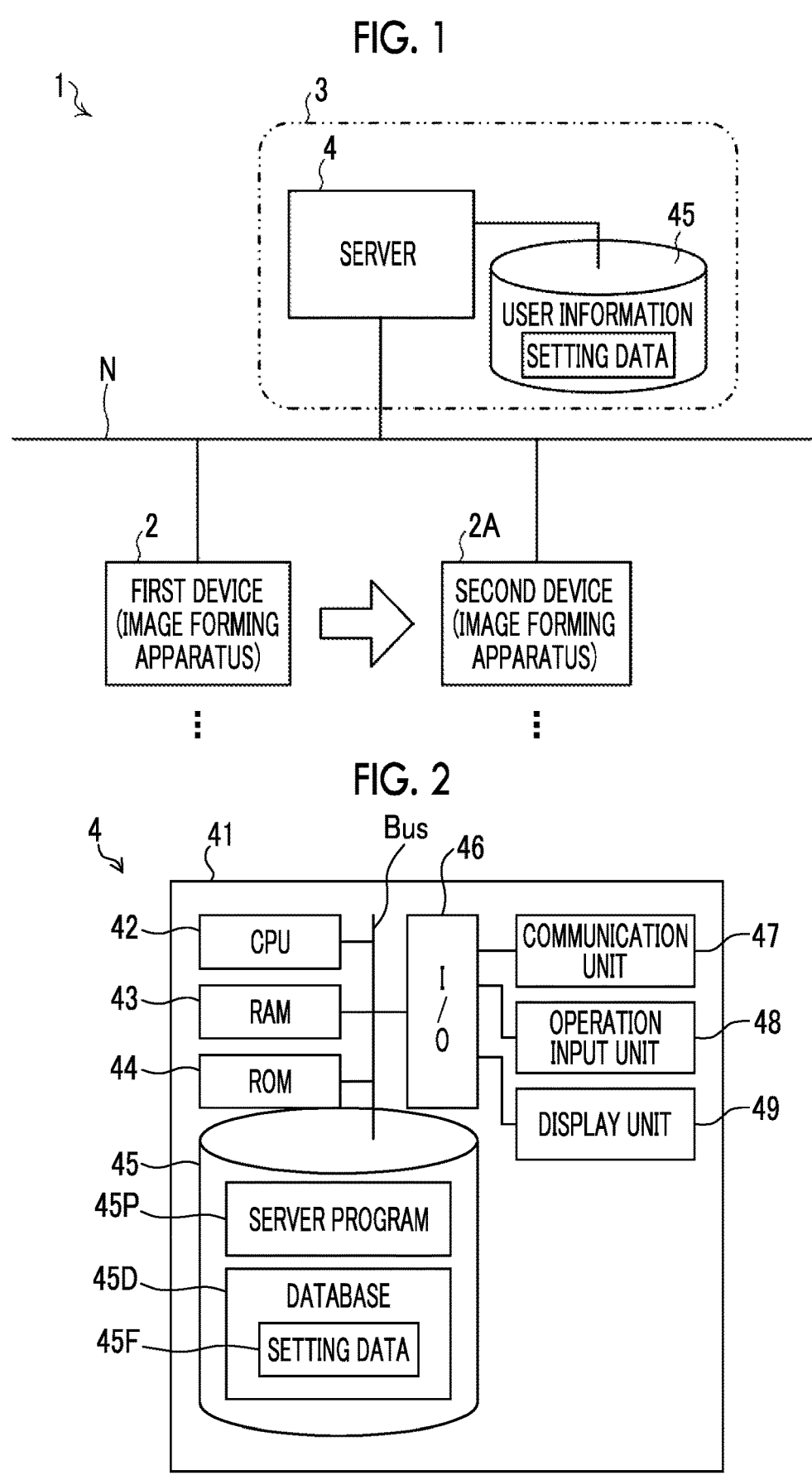
FIG. 1 is a diagram showing an example of a schematic configuration of an information processing system according to a first exemplary embodiment.
FIG. 2 is a diagram showing an example of an electrical schematic configuration of a server according to the first exemplary embodiment.

FIG. 1 is a diagram showing an example of a schematic configuration of an information processing system according to an exemplary embodiment for implementing the technology of the present disclosure.

An information processing system 1 according to the exemplary embodiment includes an image forming apparatus 2 as a first device, an image forming apparatus 2A as a second device, and a server 4 as an information processing apparatus constructed on a cloud network 3. The image forming apparatus 2, the image forming apparatus 2A, the cloud network 3, and the server 4 are configured to be able to be connected to each other via a network N, and are configured to exchange of information with each other. As an example of the network N, a public communication line such as the Internet and a telephone network, and a network such as a local area network (LAN) and a wide area network (WAN) are applied. As the network N, at least one network of a wired or wireless communication line can be applied.

As an example of the server 4, a general-purpose computer apparatus such as a server computer or a personal computer (PC) can be applied. In the present exemplary embodiment, the server 4 functions as an information processing apparatus that provides various services to a device connected to the network N.

In the present exemplary embodiment, the server 4 is constructed in the cloud network 3 and functions as an information processing apparatus that provides various services to a device (for example, an image forming apparatus) connected to the network N. Specifically, the server 4 is constructed on the network N by using a cloud computing technology, and can be equivalently used with virtual hardware resources and software resources similar to apparatuses installed in an actual environment. Thus, the server 4 can provide various services from the cloud network 3. In the present exemplary embodiment, the server 4 is described as a virtual apparatus constructed in the cloud network 3, but it is needless to say that the server 4 may be installed in the actual environment and may be connected to the network N.

In the present exemplary embodiment, the server 4 includes a storage unit 45, stores setting data of the first device (image forming apparatus 2) in the storage unit 45, and can execute processing of providing, as an example, a service to the second device (image forming apparatus 2A) (details will be described later).

The image forming apparatus 2 as the first device is a multifunction peripheral having any plurality of functions among a plurality of functions such as a copy function, a print function, a scanner function, a facsimile function, and an optical character recognition (OCR) function. For example, in a case where a print job from a terminal apparatus (not shown) such as a PC is received, the image forming apparatus 2 executes print processing based on a print job. For example, the image forming apparatus 2 has a function of scanning a document and transmitting scanned data to a terminal apparatus or the like (not shown).

The image forming apparatus 2A as the second device is an image forming apparatus of the same type as the image forming apparatus 2, and is an image forming apparatus for constructing the image forming apparatus 2 to be able to execute processing equivalent to the image forming apparatus 2 by using the setting of the image forming apparatus 2.

A terminal apparatus (not shown) can be connected to the network N. As the terminal apparatus (not shown), a general-purpose computer apparatus such as a personal computer (PC) can be applied.

Incidentally, a user may want to reflect setting data of a predetermined image forming apparatus on setting data of another image forming apparatus different from the predetermined image forming apparatus such that the other image forming apparatus operates similarly to the predetermined image forming apparatus. However, the setting data of the predetermined image forming apparatus may include information that is unique to the user and is not intended to be known to a third party. Thus, for example, it is preferable that processing is performed such that the setting data of the predetermined image forming apparatus is not leaked to a third party other than the user.

However, in a case where the setting data of the predetermined image forming apparatus is taken out from the predetermined image forming apparatus and is reflected on another image forming apparatus, the third party other than the user can refer to the setting data from when the setting data is taken out to when the setting data is reflected, and thus, the setting data may be leaked.

Thus, in the present exemplary embodiment, control is performed such that a second account associated with a first account of a registered user and different from the first account is temporarily created and setting data is exchanged via the second account. Accordingly, information leakage is reduced as compared with a case where the setting data set in the image forming apparatus which is the device is stored in a storage area to be acquirable by any third party.

Specifically, the information processing apparatus according to the exemplary embodiment includes a processor, and the processor generates a second account in association with a first account. Specifically, the processor accepts an instruction to generate a second account indicating access information for permitting access to a second storage area, which is different from a first account that indicates a registered user and indicates access information for permitting access to a first storage area. The processor generates a second account in association with a registered first account. In a case where a request indicating that setting data as setting information set for the first device is to be stored in the second storage area is accepted, the processor performs control such that the setting data is acquired and stored in the second storage area by using the second account. The processor performs control such that the setting data stored in the second storage area is acquired by using the second account from a second device different from a first device and is output to the second device. The processor performs control such that the setting data stored in the second storage area is moved to the first storage area and the second account and the second storage area are erased.

Next, an example of a configuration of the server 4 will be described with reference to FIG. 2. FIG. 2 is a diagram showing an example of an electrical schematic configuration of the server 4 according to the present exemplary embodiment.

Specifically, as shown in FIG. 2, the server 4 includes a computer body 41. The computer body 41 includes a central processing unit (CPU) 42, a random access memory (RAM) 43, a read-only memory (ROM) 44, a storage unit 45, and an input and output port (I/O) 46. The CPU 42, the RAM 43, the ROM 44, the storage unit 45, and the I/O 46 are connected to each other via a bus Bus.

Functional units including a communication unit 47 that enables communication with an external apparatus, an operation input unit 48 that enables an operation input by the user, and a display unit 49 that enables display of an image are connected to the I/O 46. These functional units can mutually communicate with the CPU 42 via the I/O 46.

The computer body 41 may be a sub-controller that controls a part of an operation of the server 4, or may be a part of a main controller that controls an overall operation of the server 4. For example, an integrated circuit such as a large scale integration (LSI) or an integrated circuit (IC) chipset is used for a part or all of blocks of the computer body 41. An individual circuit may be used for each of the blocks, or a circuit in which a part or all of the blocks are integrated may be used. The blocks may be provided integrally, or a part of the blocks may be provided separately. In each of the blocks, a part thereof may be separately provided. A dedicated circuit or a general-purpose processor may be used for integration of the computer body 41, and is not limited to the LSI.

Examples of the storage unit 45 include an auxiliary storage device such as a hard disk drive (HDD), a solid state drive (SSD), a flash memory, or the like. The storage unit 45 stores a server program 45P as an information processing program that causes the server 4 to function as the information processing apparatus of the present disclosure. The CPU 42 reads the server program 45P from the storage unit 45, loads the server program into the RAM 43, and executes processing. Accordingly, the server 4 operates as the information processing apparatus of the present disclosure. The specific processing of the server 4 will be described later.

The server program 45P may be stored in the ROM 44. The server program 45P may be installed in advance on the server 4, for example. The server program 45P may be realized by storing program information in a non-volatile storage medium or appropriately installing the program information distributed via the network N on the server 4. Examples of the non-volatile storage medium include a compact disc read only memory (CD-ROM), a magneto-optical disc, an HDD, a digital versatile disc read only memory (DVD-ROM), a flash memory, a memory card, and the like.

The storage unit 45 also stores a database 45D including various kinds of information that can be used by the server 4. The information stored in the database 45D is not limited to being stored in advance in the storage unit 45. For example, the information may be stored in an external apparatus (not shown) and may be acquired from an external apparatus (not shown) via a communication line.

The database 45D is configured to temporarily store setting data 25F related to the user by an account for each user who can use the service provided by the server 4.

For example, the server 4 can store the setting data of the first device (image forming apparatus 2) in the database 45D of the storage unit 45 and can execute processing related to a service provided to the second device (image forming apparatus 2A). Although details will be described later, in order for the user to enjoy the service of the server 4, an account is registered in the server 4 in advance. The account to be registered is information for each user, including, for example, a user ID and a password, and including authentication information used for user authentication performed in a case where the service of the server 4 is used. Thus, the user can use the service of the server 4 by being authenticated by the authenticated account.

The account may be identical to device authentication information to be described later, or different information may be registered for the account.

The communication unit 47 is connected to the network N and is configured to enable communication between the server 4 and the external apparatus. In the present exemplary embodiment, the image forming apparatuses 2 and 2A are applied as the external apparatus capable of communicating.

Devices for operation inputs such as a keyboard and a mouse are provided in the operation input unit 48.

Examples of the display unit 49 include a liquid crystal display (LCD), an organic electro luminescence (EL) display, and the like. A touch panel having a function of the operation input unit 48 may be applied to the display unit 49. The operation input unit 48 and the display unit 49 accept various instructions from the user. The display unit 49 displays various kinds of information such as results of processing executed in response to the instructions accepted from the user, notifications regarding the processing, and the like.

Figure 3:
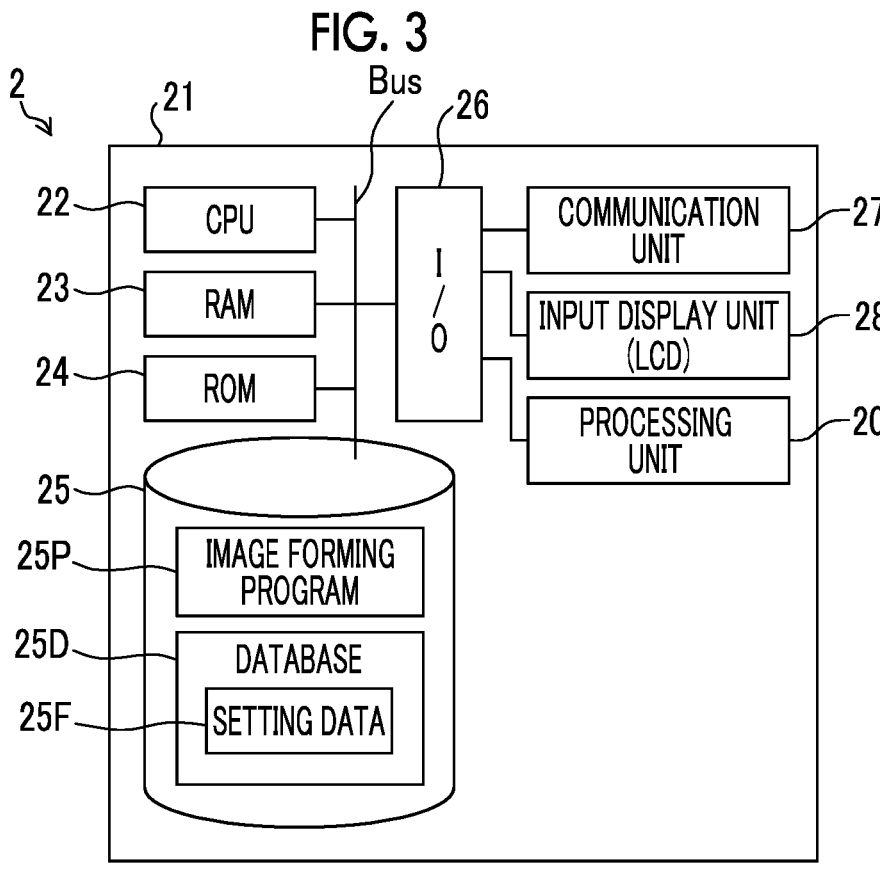
FIG. 3 is a diagram showing an example of an electrical schematic configuration of an image forming apparatus according to the first exemplary embodiment.

Next, an example of a configuration of the image forming apparatus 2 will be described with reference to FIG. 3. FIG.

3 is a diagram showing an example of an electrical schematic configuration of the image forming apparatus 2 according to the present exemplary embodiment.

The image forming apparatus 2 includes a computer body 21. The computer body 21 includes a CPU 22, a RAM 23, a ROM 24, a storage unit 25, and an I/O 26. The CPU 22, the RAM 23, the ROM 24, the storage unit 25, and the I/O 26 are connected to each other via a bus Bus.

Functional units including a communication unit 27 that enables communication with an external apparatus and an input display unit 28 that enables an operation input and information display by the user are connected to the I/O 26. These functional units can mutually communicate with the CPU 22 via the I/O 26. The input display unit 28 can apply a liquid crystal display (LCD) configured to enable input and output of information such as a touch panel.

A processing unit 20 that physically executes various functions such as the above-described copy function regarding image formation is connected to the I/O 26. The processing unit 20 executes actual image forming processing.

An image forming program 25P for causing the image forming apparatus 2 to function is stored in the storage unit 25. The CPU 22 reads the image forming program 25P from the storage unit 25, loads the image forming program 25P into the RAM 23, and executes image forming processing. Accordingly, the image forming apparatus 2 that executes the image forming program 25P can execute various kinds of processing related to image formation.

The storage unit 25 also stores a database 25D including various kinds of information that can be used by the image forming apparatus 2. The setting data 25F related to the image forming processing executed by the image forming apparatus 2 is registered in the database 25D. For example, the setting data 25F includes a setting value applied by a function executed by the image forming apparatus 2. The setting data 25F is reflected on another image forming apparatus, and thus, the function corresponding to the setting data 25F of the image forming apparatus 2 can be executed by the other image forming apparatus. Examples of the function that can be executed by the image forming apparatus 2 include an e-mail function, a file transmission function, and a facsimile transmission function.

The setting data 25F includes user information of a user who uses the image forming apparatus 2. An address book and authentication user data are applied as an example of the user information. In the address book, information indicating a mail address, a file server address, and a fax number can be stored as records to be able to be designated by the user.

The mail address is information indicating a destination of e-mail, and is information designated by the user in a case where data such as an image scanned and an image processed by the image forming apparatus 2 is transmitted to another apparatus by using the e-mail function. The image forming apparatus 2 can transmit an e-mail with a designated e-mail address as a destination by the e-mail function with data of the scanned image attached.

The file server address is information indicating a position of a file server, and is information designated by the user in a case where data such as an image scanned and an image processed by the image forming apparatus 2 is transmitted to the file server by using the file transmission function. The image forming apparatus 2 can transmit data such as the scanned image and the processed image to a designated file server by the file transmission function.

The fax number is information indicating a transmission destination by facsimile, and is information designated by the user in a case where data such as an image scanned and an image processed by the image forming apparatus 2 is transmitted to a facsimile apparatus of the transmission destination by using the facsimile transmission function. The image forming apparatus 2 can transmit data such as the scanned image and the processed image to the designated facsimile apparatus by the facsimile transmission function.

In the above description, the information indicating the destination to which the data is transmitted is not limited to the mail address, the file server address, and the fax number. For example, any data may be used as long as the destination can be designated, and an IP address or a Mac address unique to the apparatus may be used.

File server authentication information and body authentication user data are applied to an example of the authentication user data.

The file server authentication information includes, for example, a user ID and a password, and is authentication information used at the time of user authentication performed in a case where the user logs in to the file server of the data transmission destination. In a case where the image forming apparatus 2 logs in to the file server by the instruction given by the user, the image forming apparatus 2 logs in to the file server by using the registered file server authentication information.

The device authentication information includes, for example, a user ID and a password, and is registered authentication information used at the time of user authentication performed in a case where the user logs in to the device, that is, the image forming apparatus 2. In a case where the user logs in to the image forming apparatus 2, the image forming apparatus 2 compares the registered authentication information with the input authentication information, and permits the login in a case where these pieces of information match.

The address book, the authentication user data, the information indicating the mail address, the file server address, and the fax number, the file server authentication information, and the body authentication user data are examples of item information of the present disclosure.

The communication unit 27 is connected to the network N and is configured to communicate with an external apparatus. The input display unit 28 accepts various instructions from the user of the image forming apparatus 2, and the display unit 29 displays various kinds of information such as results of processing executed in response to the instructions accepted from the user, notifications regarding the processing, and the like.

Since a configuration of the image forming apparatus 2A is similar to the configuration of the image forming apparatus 2A, detailed descriptions will be omitted. In the following description, in a case where the image forming apparatus 2 and the image forming apparatus 2A are described differently, a reference sign "A" is added to the components of the image forming apparatus 2A.

Figure 4:
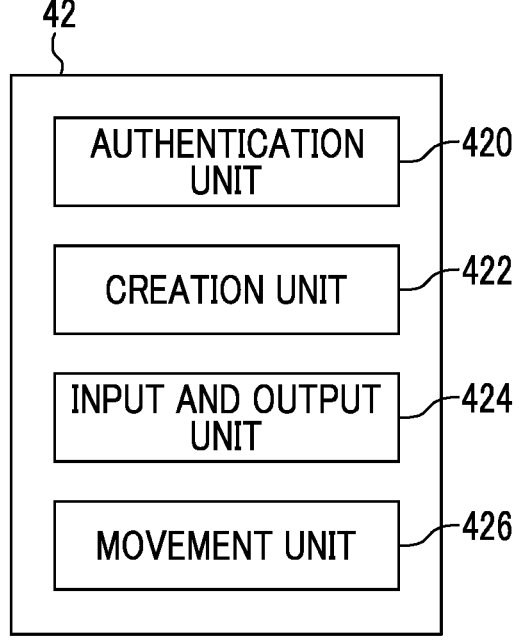
FIG. 4 is a diagram showing an example of an electrical schematic configuration of a virtual image forming apparatus according to the first exemplary embodiment.

Next, a functional configuration of the server 4 will be described. FIG. 4 is a diagram showing an example of a functional configuration in which the CPU 42 executes a program on the server 4 according to the present exemplary embodiment.

The server 4 includes an authentication unit 420, a creation unit 422, an input and output unit 424, and a movement unit 426. The CPU 42 of the server 4 executes the server program 45P, and thus, the server 4 functions as the authentication unit 420, the creation unit 422, the input and output unit 424, and the movement unit 426.

The authentication unit 420 is a functional unit that authenticates a registered user by comparing an account of an input user with a registered account. For example, in a case where a user ID and a password of the first account (registered account) which is the registered account and a user ID and a password of the first account of the input user match each other, the authentication unit 420 completes authentication as the registered user and permits login. User authentication is enabled by executing the function of the authentication unit 420.

The creation unit 422 is a functional unit that creates a temporary account (provisional account) in a case where the service of the server 4 described above is used. Specifically, in a case where the authentication unit 420 completes authentication as the registered user, a second account that is different from the registered first account and is a temporary account (provisional account) associated with the registered account is created in response to an instruction of the user. The function of the creation unit 422 is executed, and thus, the provisional account of the user can be created.

In a case where the provisional account is created, for example, it is preferable that (the service of) the server 4 registers information indicating the device operated by the user (for example, the image forming apparatuses 2 and 2A), for example, identification information in association with the provisional account. By registering the information indicating the device in association with the provisional account, access only from the registered device can be performed, and access from other devices can be blocked.

The input and output unit 424 is a functional unit that inputs and outputs the setting data of the image forming apparatus 2. Specifically, in a case where the authentication is completed with the provisional account created by the creation unit 422, processing of acquiring the setting data of the image forming apparatus 2 which is the first device, storing the setting data in the storage unit 45, and outputting the setting data to a certain image forming apparatus 2A which is the second device is executed. By executing the function of the input and output unit 424, it is possible to perform processing of storing the setting data of the image forming apparatus 2 in the storage unit 45 of the server 4 or outputting the setting data from the storage unit 45.

The movement unit 426 is a functional unit that enables the registered account of the user to refer to the setting data processed with the provisional account. Specifically, control is performed such that the setting data temporarily stored with the provisional account is moved to the storage area managed with the registered account of the user. By executing the function of the movement unit 426, the user can confirm the completion of the service use of the server 4.

Next, an operation of the information processing system 1 according to the present exemplary embodiment will be described focusing on the processing executed by the server 4.

In the present exemplary embodiment, a case where the setting data of the image forming apparatus 2 is reflected in the image forming apparatus 2A will be described. A case where the processing in the image forming apparatus 2 is performed by an instruction given by a user who is using the image forming apparatus 2 (using user) will be described. A case where the processing in the image forming apparatus 2A is performed by an instruction by a dealer (designated user) who is a user designated by the using user as the provisional user, unlike the using user, will be described. It is assumed that an account (using account) of the using user is registered in the server 4. In the server 4, a storage area for storing authentication information and various kinds of data with which the using user logs in to enable the use of the above-described service with the using account is defined at the time of registration of the using account.

Figure 5:
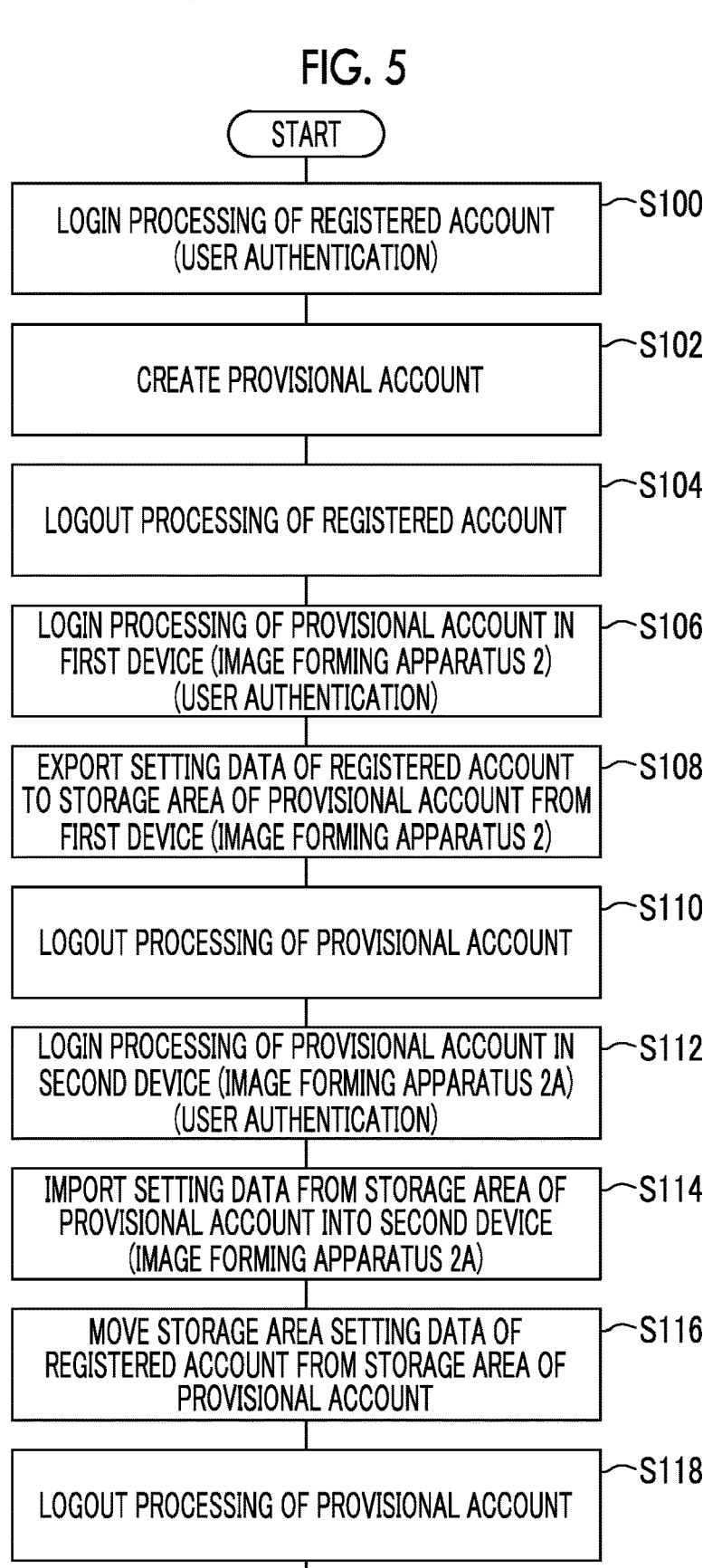
FIG. 5 is a flowchart showing an example of a flow of processing by a server program of the server according to the first exemplary embodiment.
Figure 6:
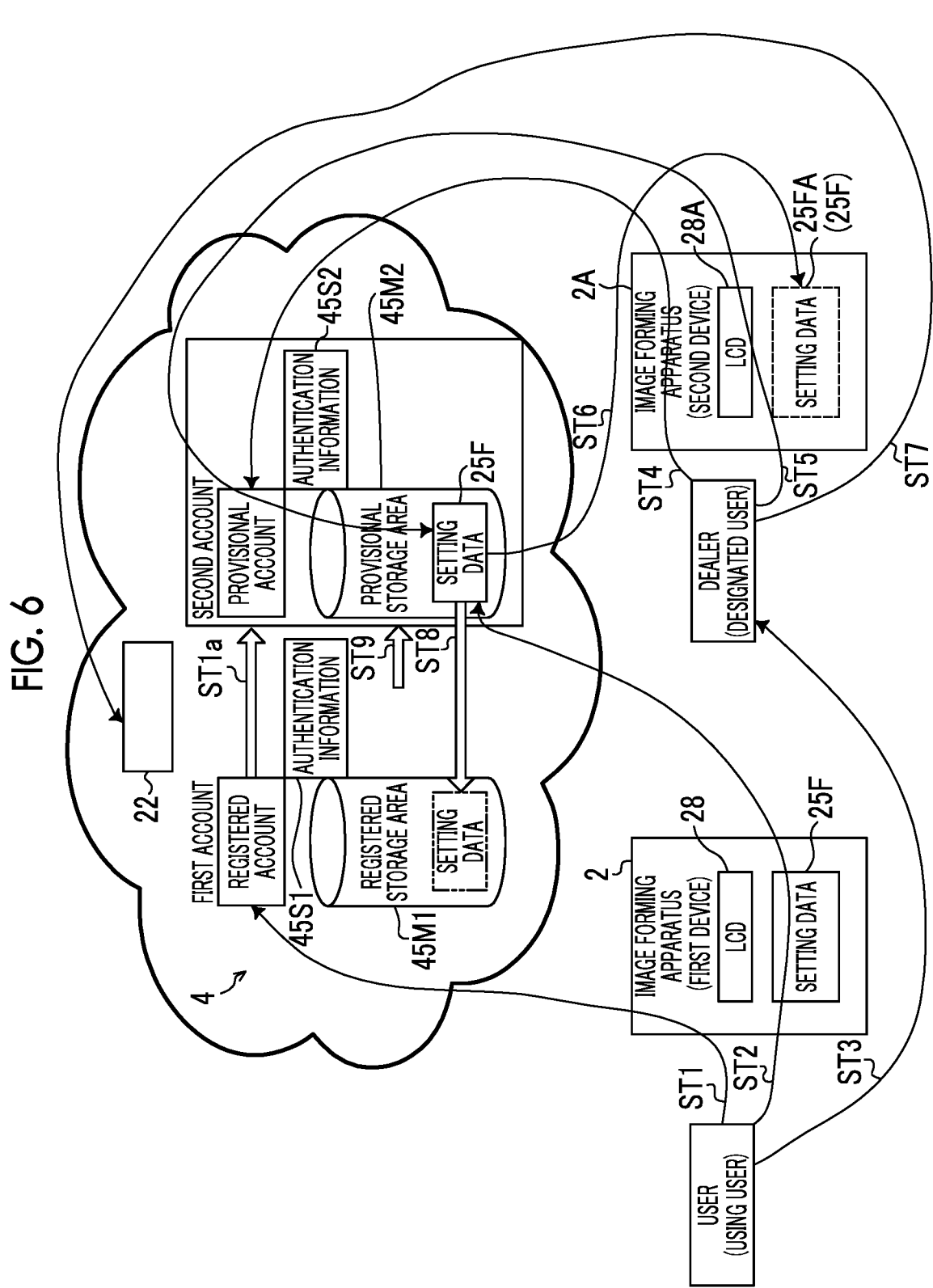
FIG. 6 is a conceptual diagram showing an example of a flow of information between devices of the information processing system according to the first exemplary embodiment.

FIG. 5 is a flowchart showing an example of a flow of processing by the server program 45P of the server 4 executed as the information processing apparatus. FIG. 6 is a conceptual diagram showing an example of a flow of information between the devices of the information processing system 1.

In the information processing system 1, creation processing of creating the provisional account from the using account, input and output processing of inputting and outputting the setting data by using the provisional account, and movement processing of moving the setting data stored in the storage area of the provisional account are executed. In the creation processing, the provisional account is created in association with the using account. In the input and output processing, the setting data of the image forming apparatus 2 is output (exported) to the storage area of the provisional account, and the setting data stored in the storage area of the provisional account is input (imported) to the image forming apparatus 2A. In the movement processing, the setting data stored in the storage area of the provisional account is moved to the storage area of the using account.

Specifically, in the server 4, the CPU 42 executes the following steps in response to an instruction to start the server program 45P.

First, in step S100 of FIG. 5, login processing of the registered account which is the first account is executed including authentication processing for the using user.

In a case where the authentication processing fails a predetermined number of times in step S100, the present processing routine is forcibly ended, or the present processing routine is ended after executing predetermined processing associated with the failure of the authentication processing is executed.

Subsequently, in a case where the authentication processing of the using user succeeds, in step S102, processing of accepting an instruction to create the provisional account from the image forming apparatus 2 and creating the provisional account which is the second account associated with the first account is executed.

In a case where the processing of creating the second account (provisional account) is ended, logout processing of the first account (registered account) is executed in step S104.

Specifically, in the information processing system 1, as shown in procedure ST1 of FIG. 6, the using user operates the input display unit (LCD) of the image forming apparatus 2 which is the first device, and thus, login processing for (the service of) the server 4 is performed. The server 4 accepts the user ID and the password from the image forming apparatus 2, and permits login to the server 4, that is, access to at least the server 4 in a case where the accepted user ID and password match the registered user ID and password. The permission to access the server 4 includes, for example, permission to use a service executed on the server 4.

Subsequently, the server 4 creates the provisional account which is the second account associated with the first account. The registered account which is the first account is registered in advance in the server 4, and as shown in FIG. 6, authentication information 45S1 is registered in the database 45D in association with the first account. A first storage area 45M1 capable of storing the setting data in the first account is set in the storage unit 45. The server 4 creates the provisional account which is the second account associated with the first account (procedure ST1a). Specifically, authentication information 45S2 is registered in the database 45D in association with the second account, and a second storage area 45M2 is set in the storage unit 45 in association with the second account. Thus, the using user can use the first account and the second account.

Subsequently, in step S106 of FIG. 5, the login processing including the authentication processing of the provisional account is executed by the image forming apparatus 2 which is the first device.

In step S108, in a case where the authentication processing of the provisional account succeeds, processing of exporting the setting data of the image forming apparatus 2 to the storage area of the provisional account is executed. That is, in step S108, the setting data 25F output from the image forming apparatus 2 is accepted and stored in the storage area 45M2 (FIG. 6) of the provisional account which is the second account.

In a case where storage processing of the setting data by the provisional account is ended, in step S110, logout processing of the provisional account is executed.

Specifically, in the information processing system 1, as shown in procedure ST2 of FIG. 6, the using user operates the input display unit (LCD) of the image forming apparatus 2 which is the first device, and thus, login processing for (the service of) the server 4 by the provisional account is performed. The server 4 accepts the user ID and the password of the provisional account from the image forming apparatus 2, and permits login to the server 4, that is, access to at least a storage area 12M2 set in the provisional account of the server 4 in a case where the accepted user ID and password match the user ID and the password of the provisional account created as described above. The server 4 accepts the setting data 25F output from the image forming apparatus 2 and stores the setting data in the storage area 45M2 of the provisional account which is the second account.

After logging out from the access by the provisional account, the using user notifies a dealer designated in advance as the designated user of the information on the provisional account as the second account, as shown in procedure ST3. It is assumed that the dealer designated in advance is set in advance by the using user as a user who permits the setting data 25F of the image forming apparatus 2 to be reflected in the image forming apparatus 2A. By the notification, the designated user who is the dealer can perform processing for the setting data stored in the storage area 45M2 of the provisional account by using only the provisional account.

Subsequently, in step S112 of FIG. 5, login processing of the provisional account is executed by the image forming apparatus 2A which is the second device. Here, the authentication processing of the designated user which is the dealer is performed.

In step S114, processing of importing the setting data of the provisional account into the image forming apparatus 2A which is the second device is executed.

That is, in step S114, in a case where the authentication processing of the provisional account succeeds, an instruction to import the data stored as the setting data 25F of the image forming apparatus 2 into the image forming apparatus 2A is accepted. Subsequently, processing of inputting the setting data 25F stored in the storage area 45M2 of the provisional account to the image forming apparatus 2A is performed. That is, in the image forming apparatus 2A, the setting data 25F output from the server 4 is stored as setting data 25FA of the image forming apparatus 2A in the storage unit 25A of the image forming apparatus 2A.

In a case where the setting data of the provisional account is imported into a plurality of second devices (image forming apparatuses 2A), the processing of steps S106 and S108 may be repeatedly executed for each of the plurality of second devices (image forming apparatuses 2A).

Specifically, in the information processing system 1, as shown in procedure ST4 of FIG. 6, the designated user who is the dealer operates the input display unit (LCD) of the image forming apparatus 2A which is the second device, and thus, login to (the service of) the server 4 is performed with the provisional account. The server 4 accepts the user ID and the password from the image forming apparatus 2A, and permits login to the server 4 in a case where the accepted user ID and the password match the user ID and the password of the registered provisional account.

Subsequently, in the information processing system 1, as shown in procedure ST5, the designated user who is the dealer gives, to the server 4, an instruction to import the setting data 25F into the image forming apparatus 2A. As shown in procedure ST6, the server 4 imports the setting data 25F into the image forming apparatus 2A by accepting the import instruction from the image forming apparatus 2A under the provisional account and outputting the setting data 25F stored in the second storage area 45M2. Thus, the setting data 25F stored in the image forming apparatus 2 can be stored as the setting data 25FA in the storage unit 25A of the image forming apparatus 2A. In a case where the setting data is imported into the plurality of image forming apparatuses 2A as described above, import processing for each of the plurality of image forming apparatuses 2A may be repeatedly executed.

In a case where the processing of importing the setting data 25F into the image forming apparatus 2A is ended, processing of moving the setting data from the storage area of the provisional account to the storage area of the registered account is executed in step S116 of FIG. 5.

In a case where the processing of moving the setting data in the provisional account is ended, in step S118, the logout processing of the provisional account is executed, and the present processing routine is ended.

Specifically, in the information processing system 1, as shown in procedure ST7 of FIG. 6, the designated user who is the dealer gives, to (the service of) the server 4, an instruction to move the setting data. Specifically, the CPU 22 of the server 4 accepts the information on the movement instruction by the operation of the input display unit (LCD) of the image forming apparatus 2A under the provisional account. That is, the input display unit (LCD) of the image forming apparatus 2A is operated under the provisional account, and thus, the designated user gives, to (the service of) the server 4, an instruction to move the setting data from the storage area of the provisional account to the storage area of the registered account. The instruction is not limited to the instruction to move the setting data. For example, the instruction may be an instruction to confirm the import completion of the setting data 25F into the image forming apparatus 2A. In this case, in a case where information indicating the import completion confirmation is accepted, the server 4 may proceed to processing of moving the setting data from the storage area of the provisional account to the storage area of the registered account.

In a case where the instruction from the image forming apparatus 2A is accepted, the server 4 executes processing of moving the setting data 25F from the storage area 45M2 of the provisional account to the storage area 45M1 of the registered account, as shown in procedure ST8. Thus, the using user can confirm that the setting data 25F of the image forming apparatus 2 is reflected in the image forming apparatus 2A by referring to the first storage area 45M1 of the registered account.

Subsequently, in processing of ending the processing of moving the setting data 25F, the server 4 executes processing of erasing the provisional account as shown in procedure ST9. Thus, an environment in which the provisional account cannot be used is constructed, and the setting data 25F of the image forming apparatus 2 is not referred to thereafter.

In the above-described server 4, for example, it is preferable that a condition setting for prohibiting copying of the setting data between the accounts is set in advance. The above is effective in preventing the setting data from being leaked by copying the setting data between the accounts on the server 4.

In a case where the server 4 logs in with the provisional account, for example, it is preferable that a condition setting for prohibiting deletion of information related to the provisional account is set in advance. The above is effective in preventing the using user from erasing a trace of unintended processing in a case where the unintended processing is performed by using the provisional account.

The processing by the server 4 in accordance with the condition setting for prohibiting copying of the setting data described above is an example of control for excluding the acceptance of a request for copying the account and at least a part of the storage area belonging to the account. The account in this case includes at least one of the registered account or the provisional account, and the above-mentioned request includes a request for copying information of a part of at least one of the registered account or the provisional account. The processing in accordance with the condition settings for prohibiting the deletion of the information related to the provisional account is an example of control of excluding the acceptance of a request for erasing the second account and at least a part of the second storage area of the technology of the present disclosure. That is, in a case where a request corresponding to the condition setting is performed, the control for excluding the acceptance of the request may be performed.

In order for the using user to confirm the execution of the unintended processing, for example, it is preferable that the trace of the processing is recorded. For example, in a case where the setting data 25F of the image forming apparatus 2 is reflected in another image forming apparatus 2A by using the provisional account, processing of reflecting the setting data 25F in the image forming apparatus 2A may be recorded as history information. The confirmation of the execution of the unintended processing is can be realized by uniformly recording the trace of the processing as a history of processing intended and processing not intended by the using user. In this case, history information such as export history information and import history information may be recorded as attribute information in association with the setting data including the user information stored in the storage area of the account. For example, it is preferable that the export history information and the import history information include, for example, device information of an export source and device information of an import destination. The export history information and the import history information may be recorded in association with a processing time. By referring to the recorded history information, the using user can confirm the processing of importing the setting data and the processing of exporting the setting data, and can confirm the processing intended by the user and the processing not intended by the using user.

The processing from step S100 to step S104 described above is an example of the processing executed by the server 4 in the above-described creation processing. The processing from step S106 to step S114 is an example of the above-described input and output processing. The processing from step S116 to step S118 is an example of the above-described movement processing.

As described above, according to the present exemplary embodiment, at the time of creating the provisional account, the server 4 registers the information indicating the image forming apparatus 2 of the export source which is the first device in association with the provisional account. In a case where the login is from a device other than the first device, the server 4 may cause the using user to register the information indicating the image forming apparatus 2 of the export source in the provisional account. Thus, in a case where the image forming apparatus 2 (export source device) attempts to log in to the server 4 with the provisional account, the server 4 can perform authentication by extracting the fact that the image forming apparatus 2 (exporting source device) is registered in association with the provisional account, and can permit the login. On the other hand, even though the image forming apparatus 2 attempts to log in with an account other than the provisional account, the server 4 does not permit the login. As described above, since the image forming apparatus 2 which is the export source device can log in to (the service of) the server 4 only with the provisional account, it is possible to prevent the setting data from being exported to an account of another user.

After the setting data 25F is imported into the image forming apparatus 2A, the setting data 25F stored in the storage area 45M2 of the provisional account is moved to the storage area 45M1 of the registered account. Thus, after the setting data 25F is moved, since the image forming apparatus can log in to the server 4 from the image forming apparatus 2 which is the export source device only with a registered account of a movement destination, it is possible to prevent the setting data 25F from being exported to another account, for example, a storage area of a provisional account used as the designated account by the dealer.

Second Exemplary Embodiment

Next, a second exemplary embodiment will be described. Since the second exemplary embodiment has a configuration similar to the first exemplary embodiment, identical parts are designated by the same reference signs and detailed descriptions will be omitted. Parts of the second exemplary embodiment different from the first exemplary embodiment will be described.

In the first exemplary embodiment, a case where the setting data 25F of the image forming apparatus 2 is reflected in one or more image forming apparatus 2A has been described. The second exemplary embodiment describes a case where each of the pieces of setting data 25F of the plurality of image forming apparatuses 2 is reflected in another image forming apparatus 2A.

A case where the server 4 permits addition and deletion of pieces of information of the plurality of image forming apparatuses 2 (exporting source devices) as the image forming apparatus 2 to be registered in association with the provisional account will be described. The plurality of image forming apparatuses 2 to be registered in association with the provisional account are limited to a case where the instruction is from the account (registered account) of the user with which the provisional account is associated.

Next, an operation of an information processing system 1 according to the second exemplary embodiment will be described.

Figure 7:
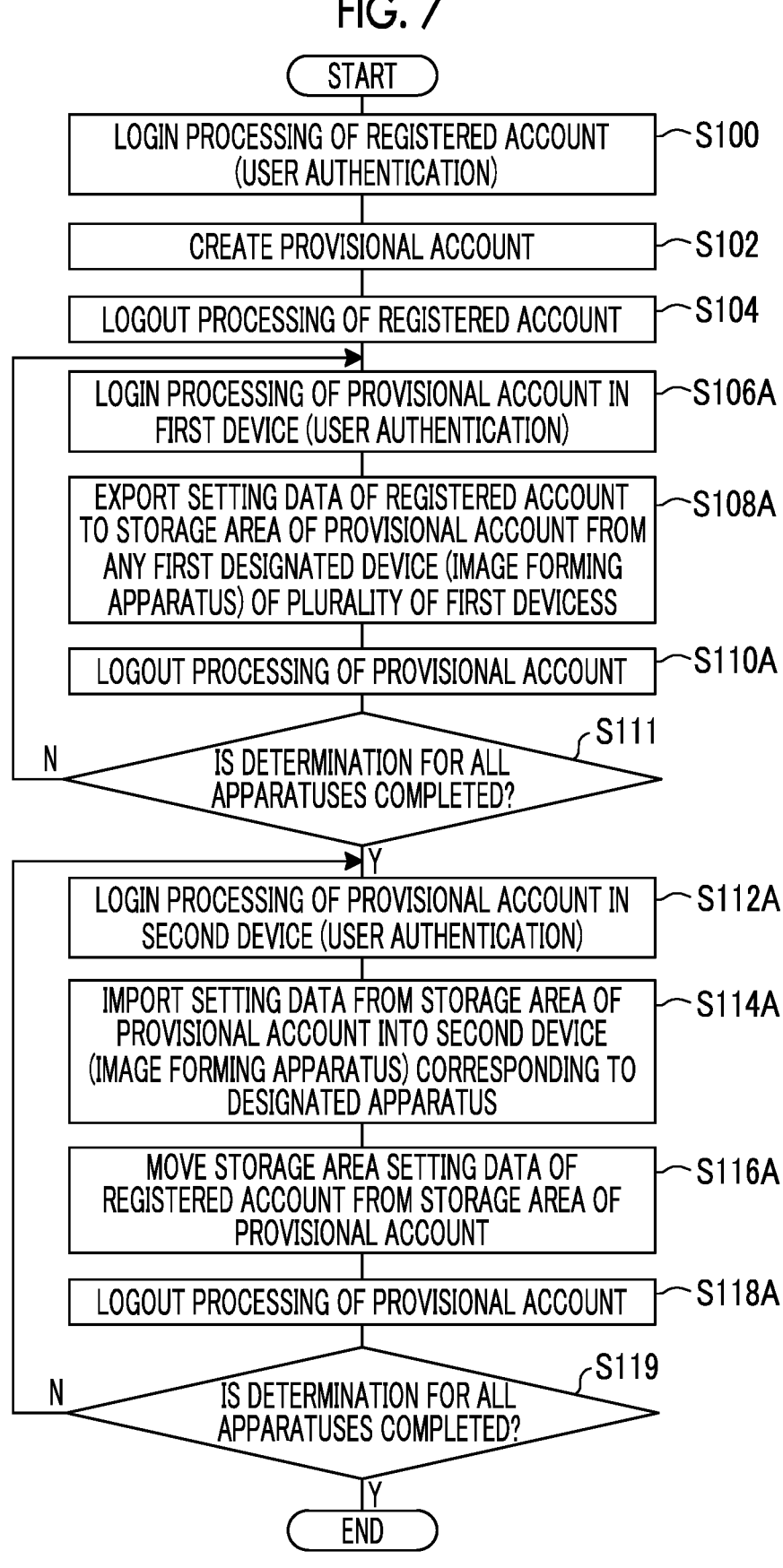
FIG. 7 is a flowchart showing an example of a flow of processing by a server program of a server according to a second exemplary embodiment.

FIG. 7 is a flowchart showing an example of a flow of processing by a server program 45P of a server 4 executed as an information processing apparatus according to the second exemplary embodiment.

First, a CPU 42 of the server 4 executes the login processing of the registered account described above (step S100), and executes processing of creating a provisional account in a case where authentication processing of the using user succeeds (step S102). In a case where the processing of creating the provisional account is ended, logout processing of the registered account is executed (step S104).

Subsequently, in step S106A, login processing including authentication processing of a provisional account is executed on a first device (image forming apparatus 2) of any one of the plurality of devices.

In step S108A, in a case where the authentication processing of the provisional account succeeds, processing of exporting setting data of the image forming apparatus 2 to a storage area 45M2 (FIG. 6) of the provisional account is executed.

In step S110A, in a case where storage processing of the setting data with the provisional account is ended, logout processing of the provisional account is executed.

In next step S111, negative determination is repeated for all of the plurality of first devices (image forming apparatuses 2) until the export processing of the setting data 25F is ended. In the case of the negative determination, the processing returns to step S106A, and in the case of positive determination, the processing proceeds to step S112A.

In step S112A, the login processing of the provisional account is executed in the second device (image forming apparatus 2A) of any one of one or a plurality of devices. Here, the authentication processing of the designated user which is the dealer is performed.

In step S114A, processing of importing the setting data 25F designated among a plurality of pieces of setting data 25F stored for the provisional account into the image forming apparatus 2A logged in by the dealer is executed.

Information designated by the designated user who is the dealer in step S114A may be used for the designation of the setting data to be exported from the setting data stored in a plurality of settings for the provisional account. In a case where the setting data is stored for the provisional account, information indicating the second device (image forming apparatus 2A) to be imported may be stored in association with the setting data 25F, and the information may be used.

After the processing of importing the setting data 25F into the image forming apparatus 2A is ended, in step S116A, processing of moving the imported setting data from the storage area 45M2 of the provisional account to a storage area 45M1 of the registered account is executed.

In a case where the processing of moving the setting data in the provisional account is ended, in step S118A, the processing of logging out of the provisional account to a target device (image forming apparatus 2A) is executed.

In next step S119, the negative determination is repeated until the import processing of the setting data 25F for all of the plurality of first devices (image forming apparatuses 2) of the import destination is ended. In the case of the negative determination, the processing returns to step S112A, and in the case of positive determination, the present processing routine is ended.

As described above, according to the present exemplary embodiment, at the time of creating the provisional account, the server 4 can register, as the setting data, the information indicating the image forming apparatuses 2 of the export sources which are the plurality of first devices in association with the provisional account. The plurality of pieces of registered setting data can be output to the image forming apparatuses 2A of one or a plurality of import destinations. Accordingly, the setting data registered in each of different image forming apparatuses 2 can be reflected in another image forming apparatus 2A.

Other Exemplary Embodiments

Although the processing executed in the server 4 has been described in the above-described exemplary embodiment, the technology of the present disclosure is not limited to the information processing executed in the server 4. For example, the information processing apparatus that executes the above-described information processing may be constructed independently of the server 4. The information processing apparatus may be configured to be processable by the image forming apparatus 2 or the image forming apparatus 2A.

In the above-described exemplary embodiment, although the case where the setting data 25F of the image forming apparatus 2 is reflected in the different image forming apparatus 2A has been described, the technology of the present disclosure is not limited thereto. For example, the setting data 25F of the image forming apparatus 2 may be distributed and reflected in the plurality of image forming apparatuses 2A. In this case, some of the different pieces of data in the setting data 25F of the image forming apparatus 2 may be imported into the different image forming apparatus 2A.

The information processing apparatus according to the exemplary embodiment has been illustrated and described above. The exemplary embodiment may be in the form of a program for causing a computer to execute the function of each unit included in the information processing apparatus. The exemplary embodiment may be in the form of a computer readable storage medium storing the program.

The configuration of the information processing apparatus described in the above exemplary embodiment is an example, and may be changed in accordance with a situation without departing from the scope.

The flow of processing of the program described in the above exemplary embodiment is also an example, and unnecessary steps may be deleted, new steps may be added, or the processing order may be changed without departing from the scope.

In the above exemplary embodiment, although a case where the processing according to the exemplary embodiment is realized by a software configuration by using a computer by executing a program has been described, the present disclosure is not limited thereto. The exemplary embodiment may be realized by, for example, a hardware configuration or a combination of hardware and software configurations.

The exemplary embodiment includes the following technologies.

(((1)))

An information processing apparatus comprising:

a processor configured to:

accept an instruction to generate a second account indicating access information for permitting access to a second storage area, which is different from a first account that indicates a registered user and indicates access information for permitting access to a first storage area;

generate the second account in association with the registered first account; perform control such that setting information set for a first device is acquired and stored in the second storage area by using the second account in a case where a request indicating that the setting information is to be stored in the second storage area is accepted;

perform control such that the setting information stored in the second storage area is acquired by using the second account from a second device different from the first device and is output to the second device; and perform control such that the setting information stored in the second storage area is moved to the first storage area and the second account and the second storage area are erased.

(((2)))

The information processing apparatus according to (((1))), wherein the processor is configured to:

perform control such that the setting information is acquired from the first device and is stored in the second storage area in a case where a request for storing the setting information in the second storage area by using the second account is accepted as the request from the first device after the generation instruction is accepted from the first device.

(((3)))

The information processing apparatus according to (((1))) or (((2))), wherein the setting information includes a plurality of pieces of item information, and the processor is configured to:

in a case where at least one piece of item information among the plurality of pieces of item information is designated and the request is accepted, perform control such that the designated at least one piece of item information is acquired as the setting information and is stored in the second storage area.

(((4)))

The information processing apparatus according to any one of (((1))) to (((3))), wherein the processor is configured to:

perform control such that acceptance of a request for erasing the second account and at least a part of the second storage area as the request by using the second account is excluded.

(((5)))

The information processing apparatus according to (((2))), wherein each of the first account and the second account includes, as the access information, authentication information for authenticating a user, the authentication information of the first account and the authentication information of the second account are different pieces of authentication information, and the processor is configured to:

generate and register the authentication information of the second account in a case where the second account is generated; and perform control such that the request is accepted in a case where the generated authentication information matches the registered authentication information of the second account.

(((6)))

The information processing apparatus according to (((2))), wherein each of the first account and the second account includes, as the access information, authentication information for authenticating a user, the authentication information of the first account is applied as the authentication information of the second account, and the processor is configured to:

generate and register the authentication information of the second account in a case where the second account is generated; and perform control such that the request is accepted in a case where the generated authentication information matches the registered authentication information of the second account.

(((7)))

The information processing apparatus according to any one of (((1))) to (((6))), wherein the setting information includes identification information of the first device, and the processor is configured to:

generate the second account in association with the identification information of the first device in a case where the second account is generated; and perform control such that the request is accepted in a case where the second account matches the identification information of the first device.

(((8)))

The information processing apparatus according to (((7))), wherein the processor is configured to:

perform control such that the request is excluded in a case where the second account does not match the identification information of the first device.

(((9)))

A non-transitory computer readable recording medium storing a program causing a processor to perform information processing of:

accepting an instruction to generate a second account indicating access information for permitting access to a second storage area, which is different from a first account that indicates a registered user and indicates access information for permitting access to a first storage area; generating the second account in association with the registered first account;

performing control such that setting information set for a first device is acquired and stored in the second storage area by using the second account in a case where a request indicating that the setting information is to be stored in the second storage area is accepted;

performing control such that the setting information stored in the second storage area is acquired by using the second account from a second device different from the first device and is output to the second device; and performing control such that the setting information stored in the second storage area is moved to the first storage area and the second account and the second storage area are erased.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a memory comprising a first storage area and a second storage area; and
   a processor configured to:
      accept an instruction to generate a second account indicating access information for permitting access to the second storage area, which is different from a first account that indicates a registered user and indicates access information for permitting access to the first storage area;
      generate the second account in association with the registered first account;
      perform control such that setting information set for a first device is acquired and stored in the second storage area by using the second account in a case where a request indicating that the setting information is to be stored in the second storage area is accepted;
      perform control such that the setting information stored in the second storage area is acquired by using the second account from a second device different from the first device and is output to the second device; and
      perform control such that the setting information stored in the second storage area is moved to the first storage area and the second account and the second storage area are erased.

2. The information processing apparatus according to claim 1, wherein the processor is configured to:
   perform control such that the setting information is acquired from the first device and is stored in the second storage area in a case where a request for storing the setting information in the second storage area by using the second account is accepted as the request from the first device after the generation instruction is accepted from the first device.

3. The information processing apparatus according to claim 2,
   wherein the setting information includes a plurality of pieces of item information, and
   the processor is configured to:
   in a case where at least one piece of item information among the plurality of pieces of item information is designated and the request is accepted, perform control such that the designated at least one piece of item information is acquired as the setting information and is stored in the second storage area.

4. The information processing apparatus according to claim 3, wherein the processor is configured to:

perform control such that acceptance of a request for erasing the second account and at least a part of the second storage area as the request by using the second account is excluded.

5. The information processing apparatus according to claim 2,
   wherein each of the first account and the second account includes, as the access information, authentication information for authenticating a user,
   the authentication information of the first account and the authentication information of the second account are different pieces of authentication information, and
   the processor is configured to:
   generate and register the authentication information of the second account in a case where the second account is generated; and
   perform control such that the request is accepted in a case where the generated authentication information matches the registered authentication information of the second account.

6. The information processing apparatus according to claim 2,
   wherein each of the first account and the second account includes, as the access information, authentication information for authenticating a user,
   the authentication information of the first account is applied as the authentication information of the second account, and
   the processor is configured to:
   generate and register the authentication information of the second account in a case where the second account is generated; and
   perform control such that the request is accepted in a case where the generated authentication information matches the registered authentication information of the second account.

7. The information processing apparatus according to claim 1,
   wherein the setting information includes identification information of the first device, and
   the processor is configured to:
   generate the second account in association with the identification information of the first device in a case where the second account is generated; and
   perform control such that the request is accepted in a case where the second account matches the identification information of the first device.

8. The information processing apparatus according to claim 7, wherein the processor is configured to:
   perform control such that the request is excluded in a case where the second account does not match the identification information of the first device.

9. The information processing apparatus according to claim 1,
   wherein after the processor imports the setting information stored in the second storage area into the second device, the processor moves the setting information stored in the second storage area to the first storage area and erases the second account and the second storage area.

10. A non-transitory computer readable recording medium storing a program causing a processor of an information processing apparatus to perform information processing of:
   accepting an instruction to generate a second account indicating access information for permitting access to a second storage area, which is different from a first account that indicates a registered user and indicates access information for permitting access to a first
storage area, wherein the first storage area and the
second storage area are in a memory of the information
processing apparatus;
generating the second account in association with the registered first account;
performing control such that setting information set for a
first device is acquired and stored in the second storage
area by using the second account in a case where a
request indicating that the setting information is to be
stored in the second storage area is accepted;
performing control such that the setting information
stored in the second storage area is acquired by using
the second account from a second device different from
the first device and is output to the second device; and
performing control such that the setting information
stored in the second storage area is moved to the first
storage area and the second account and the second
storage area are erased.
11. An information processing method, performed by an information processing apparatus, comprising:
accepting an instruction to generate a second account
indicating access information for permitting access to a second storage area, which is different from a first
account that indicates a registered user and indicates
access information for permitting access to a first
storage area, wherein the first storage area and the
second storage area are in the information processing
apparatus;
generating the second account in association with the
registered first account;
performing control such that setting information set for a
first device is acquired and stored in the second storage
area by using the second account in a case where a
request indicating that the setting information is to be
stored in the second storage area is accepted;
performing control such that the setting information
stored in the second storage area is acquired by using
the second account from a second device different from
the first device and is output to the second device; and
performing control such that the setting information
stored in the second storage area is moved to the first
storage area and the second account and the second
storage area are erased.

* * * * *